(12) United States Patent
Fukuda

(10) Patent No.: US 7,657,153 B2
(45) Date of Patent: Feb. 2, 2010

(54) DATA PROCESSING APPARATUS

(75) Inventor: Hideki Fukuda, Nara (JP)

(73) Assignee: Panasonic Corporation, Kadoma (JP)

( * ) Notice: Subject to any disclaimer, the term of this patent is extended or adjusted under 35 U.S.C. 154(b) by 764 days.

(21) Appl. No.: 10/565,057

(22) PCT Filed: Jul. 22, 2004

(86) PCT No.: PCT/JP2004/010791

§ 371 (c)(1),
(2), (4) Date: Jan. 17, 2006

(87) PCT Pub. No.: WO2005/008659

PCT Pub. Date: Jan. 27, 2005

(65) Prior Publication Data

US 2006/0181979 A1 Aug. 17, 2006

(30) Foreign Application Priority Data

Jul. 23, 2003 (JP) ............................. 2003-278069

(51) Int. Cl.
*H04N 5/76* (2006.01)
*H04N 7/00* (2006.01)
*H04N 5/00* (2006.01)

(52) U.S. Cl. ........................................ 386/46; 386/125

(58) Field of Classification Search ...................... 386/1, 386/45–46, 83, 95, 125–126
See application file for complete search history.

(56) References Cited

U.S. PATENT DOCUMENTS

| 5,541,738 A * | 7/1996 | Mankovitz .................... 386/83 |
| 6,064,635 A | 5/2000 | Machiguchi |
| 6,882,728 B1 | 4/2005 | Takahashi et al. |
| 7,136,573 B2 * | 11/2006 | Kikuchi et al. ................ 386/83 |
| 2002/0131189 A1 | 9/2002 | Kamio |
| 2002/0172496 A1 | 11/2002 | Gunji et al. |

FOREIGN PATENT DOCUMENTS

| JP | 11-053870 A | 2/1999 |
| JP | 11-176071 A | 7/1999 |
| JP | 2001-014796 A | 1/2001 |

(Continued)

OTHER PUBLICATIONS

International Search Report for corresponding Application No. PCT/JP2004/010791, mailed Nov. 2, 2004.

(Continued)

*Primary Examiner*—Thai Tran
*Assistant Examiner*—Nigar Chowdhury
(74) *Attorney, Agent, or Firm*—Renner, Otto, Boisselle & Sklar, LLP

(57) ABSTRACT

A data processing apparatus is capable of writing program data concerning video and/or audio on a first storage medium and a second storage medium. The data processing apparatus includes: a reception section for receiving a signal concerning the program data; a selection section for selecting, from among a plurality of formats, a format which is writable on the first storage medium; and a control section for writing the program data on the first storage medium in the selected format, and after writing on the first storage medium is ended, continuing to write the program data on the second storage medium in the format.

12 Claims, 12 Drawing Sheets

FOREIGN PATENT DOCUMENTS

| | | |
|---|---|---|
| JP | 2001-184676 | 7/2001 |
| JP | 2002-015423 | 1/2002 |
| JP | 2002-281436 | 9/2002 |
| JP | 2002-304803 | 10/2002 |
| JP | 2002-304822 | 10/2002 |
| JP | 2003-085893 | 3/2003 |

OTHER PUBLICATIONS

Notice of Reasons for Rejection for corresponding Japanese Application No. 2005-511955 dated Nov. 10, 2009 (with English translation).

* cited by examiner

DATA PROCESSING APPARATUS

TECHNICAL FIELD

The present invention relates to a process of writing program data concerning video and/or audio on a plurality of types of storage media, and the data processing when playing back video and the like from program data which has been written on a plurality of types of storage media.

BACKGROUND ART

As a video compression/encoding scheme to be performed for digital broadcasts and when recording to DVDs, MPEG encoding schemes are generally used. An MPEG encoding scheme is an encoding process which adaptively switches between the following encoding processes for image data: an intra-frame encoding process, which encodes image data by utilizing intra-frame correlations of pixel values; and an inter-frame encoding process, which encodes image data by utilizing inter-frame correlations of pixel values. In an MPEG encoding scheme, an image data encoding process is performed by regarding encoded data corresponding to a plurality of successive frames as one unit. For example, MPEG2 video is define in ISO/IEC 13818-2, whereas MPEG1 video is defined in ISO/IEC 11172-2.

Digital transmission of a television signal, e.g. a BS digital broadcast, is performed in the form of an MPEG transport stream, which is defined in ISO/IEC 13818-1 (MPEG2 system). An MPEG transport stream is obtained by subjecting video and audio to compression/encoding. An MPEG transport stream is directly written on a high-density and large-capacity disk which data is written on and read from by using a blue/violet laser, i.e., a Blu-ray disc (hereinafter "BD").

As another encoded stream which is obtained through compression/encoding, an MPEG program stream is also known. An MPEG program stream is an encoded stream in which the respective encoded data of video having the definition of a standard television signal and audio are multiplexed. An MPEG program stream is written on a DVD-RAM in accordance with the DVD recording standard, and written on a DVD-R medium in accordance with the DVD video standard so as to enable playback on a DVD player. Note that the DVD recording standard is described in, for example, ISO/IEC 13818-1, supra, as well as in DVD Specifications for Rewritable/Re-recordable Discs, Part 3, Video Recording, Version 1.0, September 1999 (VR pp. 1-3). The DVD video standard is described in, for example, DVD Specifications for Read-Only Disc Part 3.

There have conventionally been known apparatuses which are capable of recording video data concerning video and the like (e.g. data of a broadcast program) onto a removable storage medium mentioned above, e.g., a BD medium, a DVD-RAM medium, or a DVD-R medium, as well as onto a fixed storage medium, e.g., a hard disk. When such an apparatus performs a splice-recording, where it transitions from a recording process for the removable storage medium to a recording process for the fixed storage medium, an overlap period is observed in the video portion that is recorded on each medium, thus realizing continuous playback across the spliced portion. For example, Japanese Laid-Open Patent Publication No. 2002-281436 discloses such an apparatus.

Recording onto the aforementioned BD medium, DVD-RAM medium, and DVD-R medium is each performed in a different recording format. Therefore, in the case of a splice-recording, a recording process is to be performed in a recording format which is in accordance with each of a plurality of types of optical disks, and thereafter recording is to be performed for the hard disk. At this time, if the recording onto the hard disk is performed in a different recording format from that for the optical disk, then, during a reproduction process of the spliced portion, it becomes necessary to switch between the reproduction processes for the corresponding recording formats, which hinders smooth and continuous playback. Moreover, although some recording apparatuses are capable of mounting a plurality of types of removable storage media, it has conventionally been uncontemplated to record a program in such a manner as to be split between a plurality of types of removable storage media and a hard disk.

An objective of the present invention is to facilitate a recording process and a playback process even in the case where a splice-recording is performed between a plurality of types of storage media and another storage medium.

DISCLOSURE OF INVENTION

A data processing apparatus according to the present invention is a data processing apparatus capable of writing program data concerning video and/or audio on a first storage medium and a second storage medium, including: a reception section for receiving a signal concerning the program data; a selection section for selecting, from among a plurality of formats, a format which is writable on the first storage medium; and a control section for writing the program data on the first storage medium in the selected format, and after writing on the first storage medium is ended, continuing to write the program data on the second storage medium in the format.

The control section may further write on the second storage medium: an identifier identifying the first storage medium; and medium management information including information which identifies a state, during recording, of the program data written on the first storage medium.

With respect to a series of said program data written on the first storage medium and the second storage medium, the control section may generate splice management information and further write the splice management information on the second storage medium, the splice management information including: first list information for identifying a first portion of the program data written on the first storage medium; and second list information for identifying a second portion of the program data written on the second storage medium.

The control section may generate, as the first list information, an identifier identifying the first storage medium and position information identifying respectively a start position and an end position of the first portion of the program data, and as the second list information, an identifier identifying the second storage medium and position information identifying, respectively a start position and an end position of the second portion of the program data.

The control section may generate the position information by utilizing at least one of: addresses on the first storage medium and the second storage medium at which the first portion and the second portion of the program data are stored; times of playing back the first portion and the second portion; and information uniquely identifying respectively the first portion and the second portion.

The first storage medium may be an optical disk, and the second storage medium may be a hard disk.

A plurality of types of optical disks may be loadable as the first storage medium; and the selection section may select a format based on the type of a loaded optical disk.

A data processing method according to the present invention is capable of writing program data concerning video and/or audio on a first storage medium and a second storage medium. The data processing method includes the steps of: receiving a signal concerning the program data; selecting, from among a plurality of formats, a format which is writable on the first storage medium; and writing the program data on the first storage medium in the selected format, and after writing on the first storage medium is ended, continuing to write the program data on the second storage medium in the format.

The step of writing may further write on the second storage medium: an identifier identifying the first storage medium; and medium management information including information which identifies a state, during recording, of the program data written on the first storage medium.

With respect to a series of said program data written on the first storage medium and the second storage medium, the step of writing may generate splice management information and further write the splice management information on the second storage medium, the splice management information including: first list information for identifying a first portion of the program data written on the first storage medium; and second list information for identifying a second portion of the program data written on the second storage medium.

The step of writing may generate, as the first list information, an identifier identifying the first storage medium and position information identifying respectively a start position and an end position of the first portion of the program data, and as the second list information, an identifier identifying the second storage medium and position information identifying respectively a start position and an end position of the second portion of the program data.

The step of writing may generate the position information by utilizing at least one of: addresses on the first storage medium and the second storage medium at which the first portion and the second portion are stored; times of playing back the first portion and the second portion; and information uniquely identifying respectively the first portion and the second portion.

The first storage medium may be an optical disk, and the second storage medium may be a hard disk.

A plurality of types of optical disks may be loadable as the first storage medium; and the step of selecting may select a format based on the type of a loaded optical disk.

A data processing apparatus according to the present invention is capable of playing back video and/or audio from program data. On a first storage medium, a first portion of the program data and an identifier identifying the first storage medium are written. On a second storage medium, a second portion of the program data and medium management information are written, the medium management information including an identifier identifying the first storage medium, and information identifying a state, during writing, of the first portion of the program data written on the first storage medium. The data processing apparatus includes: a first drive for reading the identifier from the first storage medium; a second drive for reading the medium management information from the second storage medium; an analysis section for determining whether the identifier of the first storage medium matches an identifier in the medium management information, and if they match, further determining whether the current state of the first portion of the program data matches the state during writing as identified by the medium management information; and a playback section for, when the states match, playing back the video and/or audio from the first portion and the second portion of the program data from the first storage medium and the second storage medium.

A data processing method according to the present invention is capable of playing back video and/or audio from program data. On a first storage medium, a first portion of the program data and an identifier identifying the first storage medium are written. On a second storage medium, a second portion of the program data and medium management information are written, the medium management information including an identifier identifying the first storage medium, and information identifying a state, during writing, of the first portion of the program data written on the first storage medium. The data processing method includes: reading the identifier from the first storage medium; reading the medium management information from the second storage medium; determining whether the identifier of the first storage medium matches an identifier in the medium management information, and if they match, further determining whether the current state of the first portion of the program data matches the state during writing as identified by the medium management information; and, when the states match, playing back the video and/or audio from the first portion and the second portion of the program data from the first storage medium and the second storage medium.

BRIEF DESCRIPTION OF DRAWINGS

FIG. 4 is a diagram showing an exemplary structure of functional blocks in a PS (video) encoder 100a.

BEST MODE FOR CARRYING OUT THE INVENTION

Hereinafter, an embodiment of the present invention will be described with reference to the attached drawings.

In the description of the embodiment, it is assumed that a "content" means information containing video and/or audio. In other words, a "content" contains video information representing video and/or audio information representing audio. For example, a content is the video and/or audio of a program which is broadcast.

A "splice-recording" refers to recording a content while utilizing a plurality of different storage media. For example, in the case where two storage media are utilized, a "splice-recording" means recording a portion of a content on one of the storage media, and thereafter continuing to record an ensuing portion of the content onto the other storage medium, in a time-continuous manner. Similarly, a "splice-playback" refers to sequentially playing back, in the order of recording, a program which has been recorded onto a plurality of different storage media as a result of a splice-recording.

Figure 1:
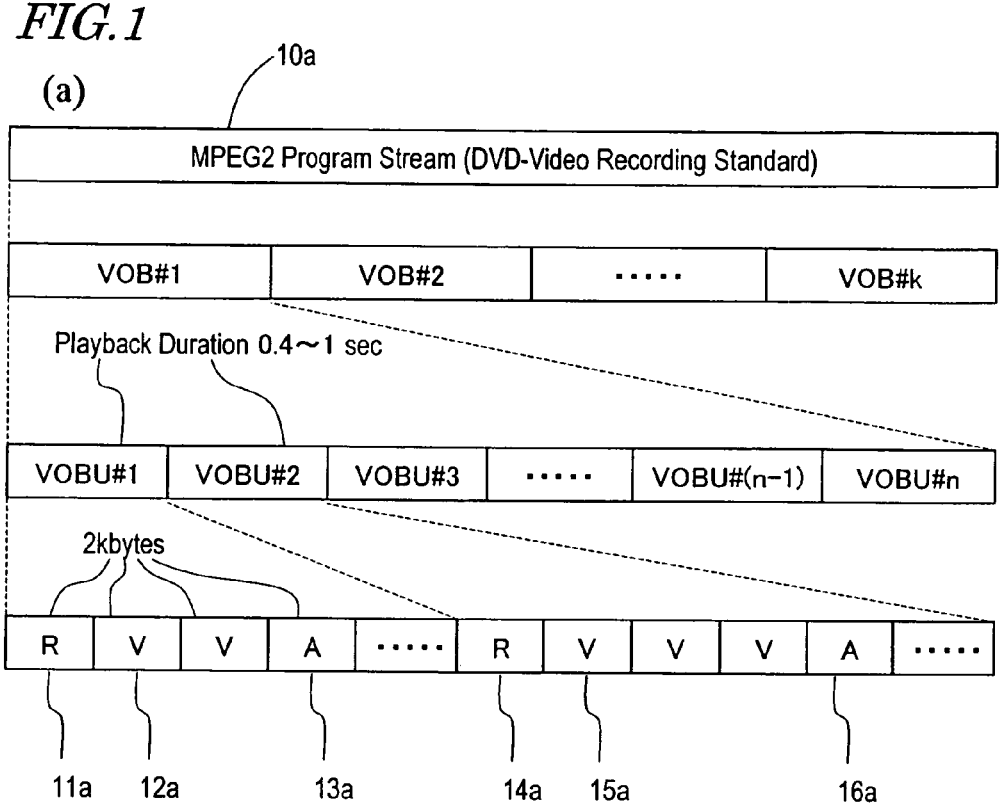
FIG. 1(a) is a diagram showing the data structure of an MPEG2 program stream 10a compliant with the DVD video recording standard.
FIG. 1(b) is a diagram showing the data structure of an MPEG2 program stream 10b compliant with the Video standard.
Figure 1:
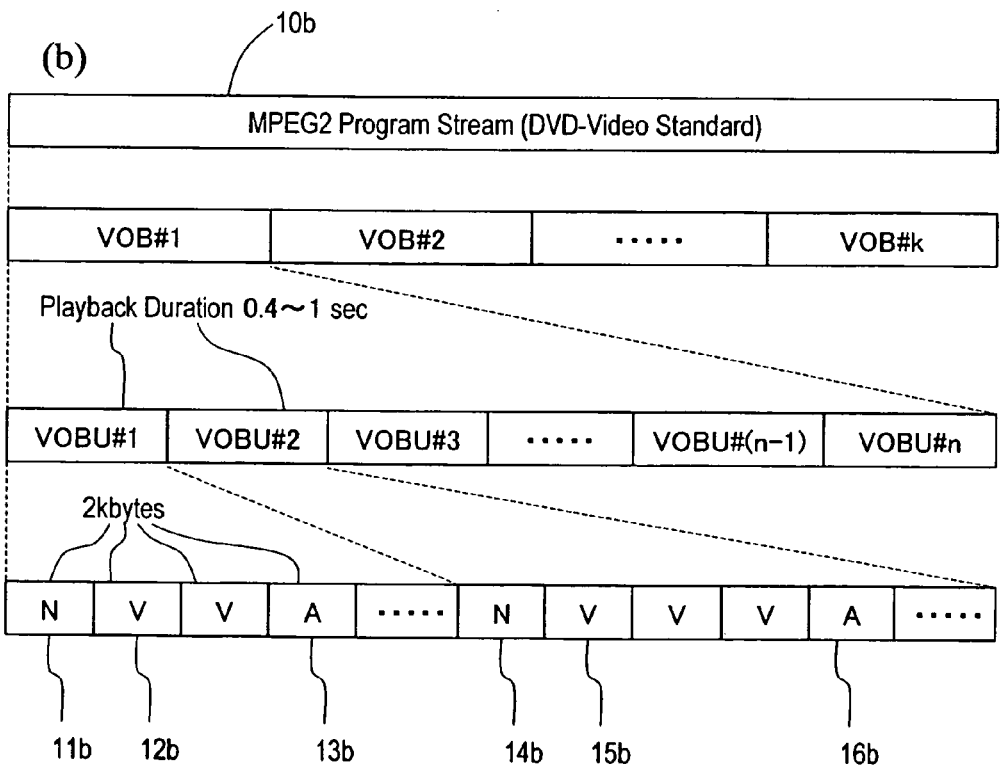

Firstly, the data structures of data streams which are used in the embodiment will be described with reference to FIG. 1 and FIG. 2. Thereafter, with reference to FIG. 3 to FIG. 15, the structures and operations of a recording apparatus and a playback apparatus according to the present embodiment will be described.

FIG. 1(a) shows a data structure for an MPEG2 program stream 10a compliant with the DVD video recording standard (hereinafter, this stream will be referred to as a "VR-compliant stream 10a").

The VR-compliant stream 10a, includes a plurality of video objects (VOBs) #1, #2, . . . , and #k. Assuming that the VR-compliant stream 10a is a content of a broadcast program, for example, each VOB stores moving picture data corresponding to a single recording operation, i.e., since the user started recording and until the user stopped it.

Each VOB includes a plurality of VOB units (video object units; VOBUs) #1, #2, . . . , and #n. Each VOBU is a data unit containing data corresponding to a video playback duration of about 0.4 second to about 1 second. Hereinafter, the data structure of VOBUs will be described, while taking as an example a VOBU which is positioned in the first place and a VOBU which is positioned in the next place.

VOBU #1 is composed of a number of packs. In the VR-compliant stream 10a, each pack has a constant data length (pack length) of 2 kbytes (2048 bytes). At the beginning of the VOBU, a real-time information pack (RDI pack) 11a is positioned as indicated by "R" in FIG. 1(a). The RDI pack 11a is followed by plural video packs "V" (a video pack 12a, etc.) and plural audio packs "A" (an audio pack 13a, etc.). Note that if the video data has a variable bit rate, the data size of each VOBU varies within a range equal to or less than a maximum recording/playback rate. If the video data has a fixed bit rate, the data size of each VOBU is substantially constant.

Each pack stores the following information. Specifically, the RDI pack 11a stores information used for controlling the playback of the VR-compliant stream 10a, e.g., information representing the playback timing of the VOBU and information for controlling copying of the VR-compliant stream 10a. The video packs 12a store MPEG2-compressed video data. The audio packs 13a store audio data that was compressed according to the MPEG2-audio standard, for example. In adjacent video packs 12a and audio packs 13a, video and audio data to be played back synchronously with each other are stored, for example; however, their arrangement (order) may be arbitrary.

VOBU #2 is also composed of a plurality of packs. An RDI pack 14a is positioned at the beginning of VOBU #2, followed by a plurality of video packs 15a, audio packs 16a, and the like. The substance of the information to be stored in these packs is similar to that of VOBU #1.

FIG. 1(b) shows the data structure of an MPEG2 program stream 10b compliant with the Video standard (hereinafter, this stream will be referred to as a "Video-compliant stream 10b").

The data structure of the Video-compliant stream 10b is similar to that of the VR-compliant stream 10a. Specifically, the Video-compliant stream 10b also includes a plurality of VOBs #1, #2, . . . , and #k, each of which is composed of a plurality of VOBUs. Each VOBU includes video packs 12b, 15b, etc. and audio packs 13b, 16b, etc. The video packs and the audio packs store video data and audio data.

The differences in data structure between the Video-compliant stream 10b and the VR-.compliant stream 10a will be described. For example, in the Video-compliant stream 10b, not the RDI pack of the VR-compliant stream 10a but a navigation pack 11b, 14b, etc., denoted as "N", is positioned at the beginning of each VOBU. The navigation pack stores navigation information for controlling the playback of the video data and audio data.

Figure 2:
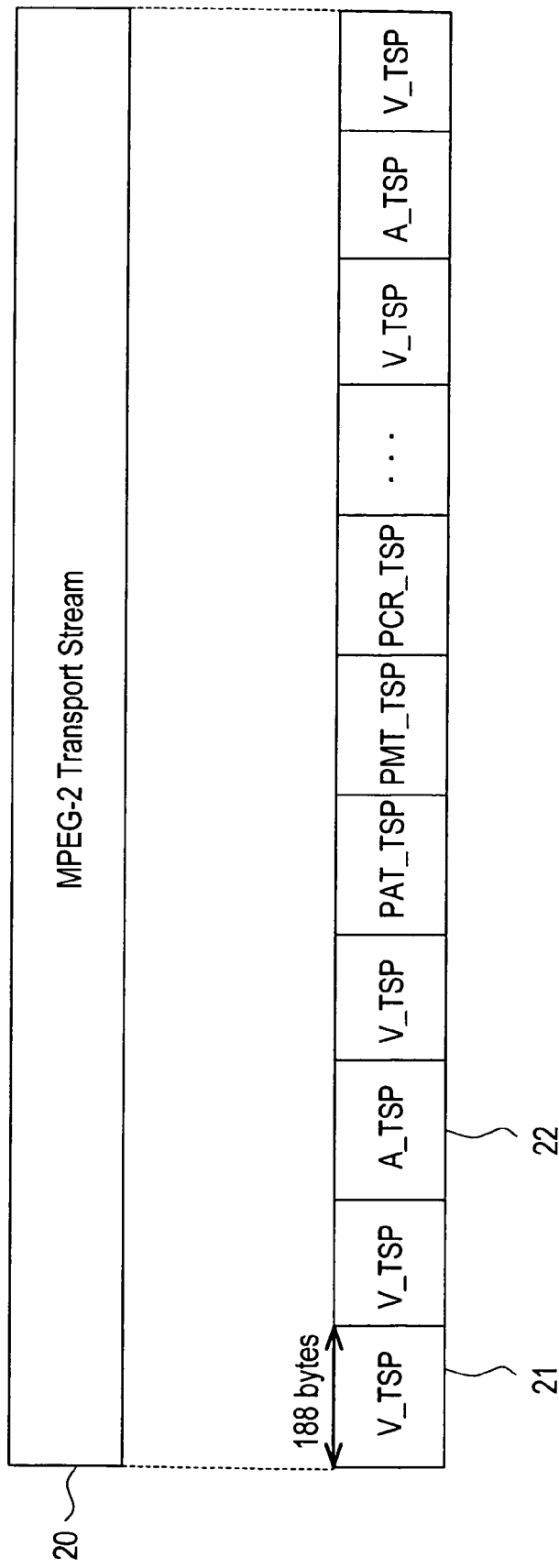
FIG. 2 is a diagram showing the data structure of a transport stream (TS) 20.

FIG. 2 shows the data structure of a transport stream (TS) 20. The TS 20 is composed of a plurality of TS packets. Examples of TS packets include a video TS packet (V_TSP) 21 in which compressed video data is stored, and an audio TS packet (A_TSP) 22 in which compressed audio data is stored. These data are data concerning video and audio, respectively, of a content which is a broadcast program. In addition, the TS 20 includes a packet (PAT_TSP) in which a program association table (PAT) is stored, a packet (PMT_TSP) in which a program map table (PMT) is stored, a packet (PCR_TSP) in which a program clock reference (PCR) is stored, and so on. The data amount of each TS packet is 188 bytes.

Figure 3:
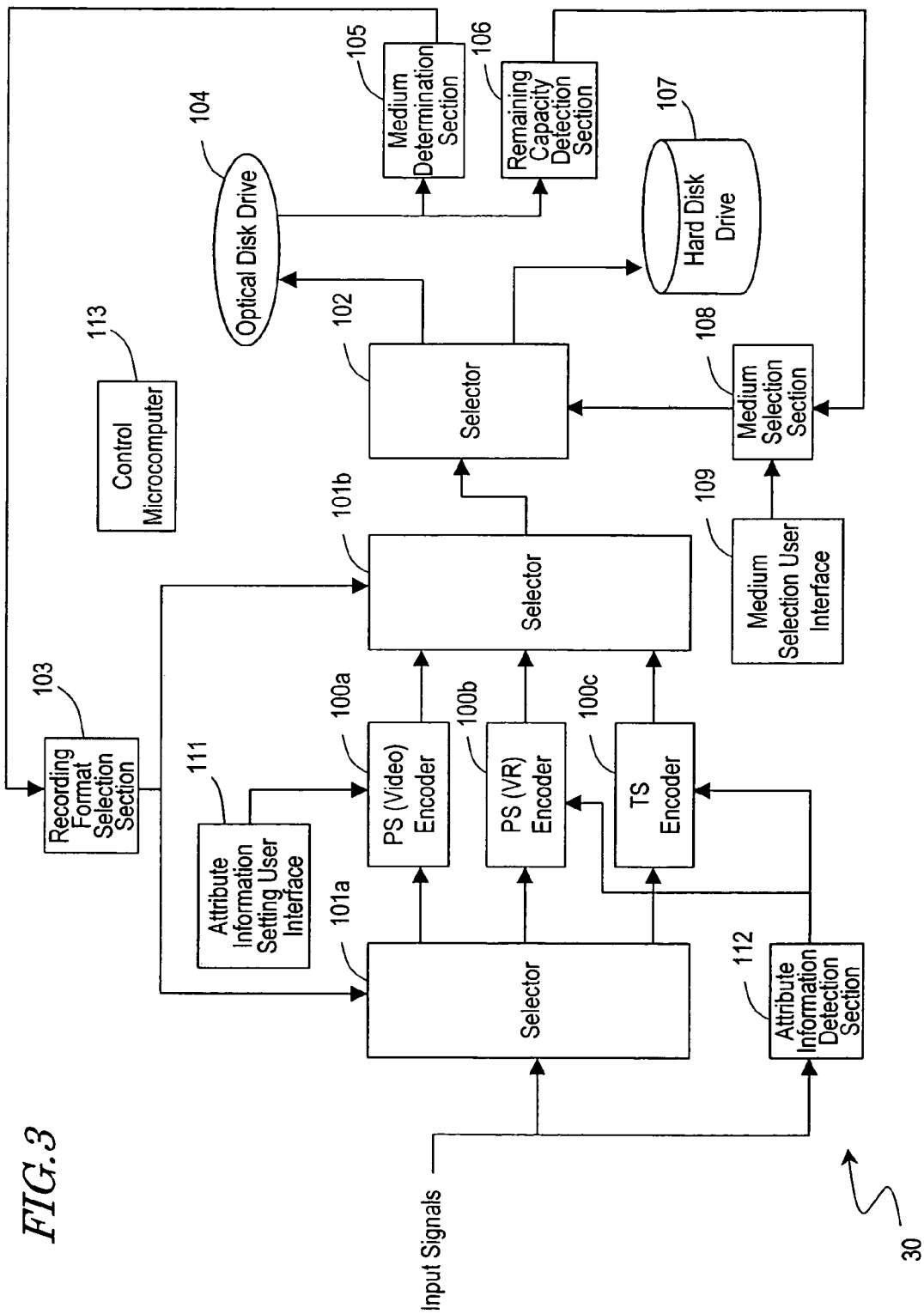
FIG. 3 is a diagram showing the structure of functional blocks in a recording apparatus 30 according to the present embodiment.

FIG. 3 shows the structure of functional blocks in a recording apparatus 30 according to the present embodiment. In the following description, it is assumed that the input signals are television program signals concerning video and/or audio. However, the input signals may be data concerning text information, program data or the like.

The recording apparatus 30 comprises a PS (video) encoder 100a, a PS (VR) encoder 100b, a TS encoder 100c, selectors 110a, 101b and 102, a recording format selection section 103, an optical disk drive 104, a medium determination section 105, a remaining capacity detection section 106, a hard disk drive 107, a medium selection section 108, a medium selection user interface 109, an attribute information setting user interface 111, an attribute information detection section 112, and a control microcomputer 113. From among a plurality of formats, the recording apparatus 30 selects a format which is writable on a loaded optical disk, writes program data which has been encoded in the selected format on that optical disk, and if the write capacity is depleted before reaching the program end, continues to write the program data on the hard disk in the same format.

Hereinafter, the constituent elements of the recording apparatus 30 will be described. The operation of each constituent element is controlled based on instructions from the control microcomputer 113. The recording apparatus 30 receives and acquires program signals (input signals) from a broadcast wave or the like, and passes the program signals (input signals) to its interior. First, based on the input signals, the PS (video) encoder 100a generates a Video-compliant stream 10b (FIG. 1(b)). Based on the input signals, the PS (VR) encoder 100b generates a VR-compliant stream 10a (FIG. 1(a)). Based on the input signals, the TS encoder 100c generates a transport stream (TS) (FIG. 2). The more specific structures of the respective encoders will be described later.

The selector 101a performs switching as to which one of the respective encoders 100a to 100c the input signals should be output to. The selector 101b receives and outputs a signal from one of the respective encoders 100a to 100c. The selector 102 outputs the input signals to either one of the optical disk drive 104 and the hard disk drive 107. The selector 102 is controlled by the medium selection section 108.

The recording format selection section 103 makes a selection as to whether the input signals are to be subjected to a recording process by the PS (video) encoder 100a, a recording process by the PS (VR) encoder 100b, or a recording process by the TS encoder 100c. Specifically, the recording format selection section 103 controls the selector 110a and the selector 101b in order to select a recording format in accordance with an output signal from the medium determination section 105 (determination signal).

The medium determination section 105 determines the type of the optical disk which is loaded in the optical disk drive 104, and outputs a determination signal. In the present embodiment, the optical disk drive 104 determines whether a DVD-R medium, a DVD-RAM medium, or an ultrahigh density RAM medium (hereinafter a "BD medium"), which is a storage medium having a larger capacity and a higher recording rate than those of a DVD-RAM, is inserted. The medium determination section 105 can determine which type of medium has been mounted based on, for example, the cartridge type of the mounted medium, determination information which is recorded at the inner periphery of the medium, and the intensity of reflected light obtained through laser light irradiation.

The remaining capacity detection section 106 detects a remaining capacity of the optical disk which is loaded in the optical disk drive 104. For example, the remaining capacity detection section 106 identifies a maximum recordable capacity from the type of the optical disk, and detects a remaining recordable capacity by subtracting the already-recorded capacity from the maximum recordable capacity.

When the remaining capacity of the optical disk becomes equal to a predetermined amount or less, the medium selection section 108 performs control so as to make a transition from a recording onto the optical disk drive 104 to a recording onto the hard disk drive 107.

The medium selection user interface 109 is to be utilized when a user inputs an instruction for switching the storage medium. There is no particular need to provide the medium selection user interface 109 because the medium selection section 108 will give an instruction to switch based on the remaining capacity as detected by the remaining capacity detection section 106.

The recording apparatus 30 performs: a recording process using the PS (video) encoder 100a in the case where the optical disk which is loaded in the optical disk drive 104 is a DVD-R medium; a recording process using the PS (VR) encoder 100b in the case where the optical disk is a DVD-RAM medium; or a recording process using the TS encoder 100c in the case where the optical disk is a BD medium.

As for the recording format for the hard disk when transitioning to a recording onto the hard disk drive 107, the type of the optical disk which is loaded in the optical disk drive 104 is adopted as it is. Specifically, the recording formats to be adopted when performing recording onto a plurality of types of optical disks are to be determined based on the loaded optical disks, but when a splice-record is to be performed from an optical disk to the hard disk through a sequence of recording operations, the recording formats of the optical disk and the hard disk are made identical. As a result, it is possible to continue processing by using the same encoder, regardless of whether a switching of the storage media is being made or not. Moreover, when playing back the program which has been splice-recorded, a seamless and continuous playback can be realized because no change in the decoding process is required when switching between a playback from the storage medium and a playback from the fixed storage medium.

Figure 4:
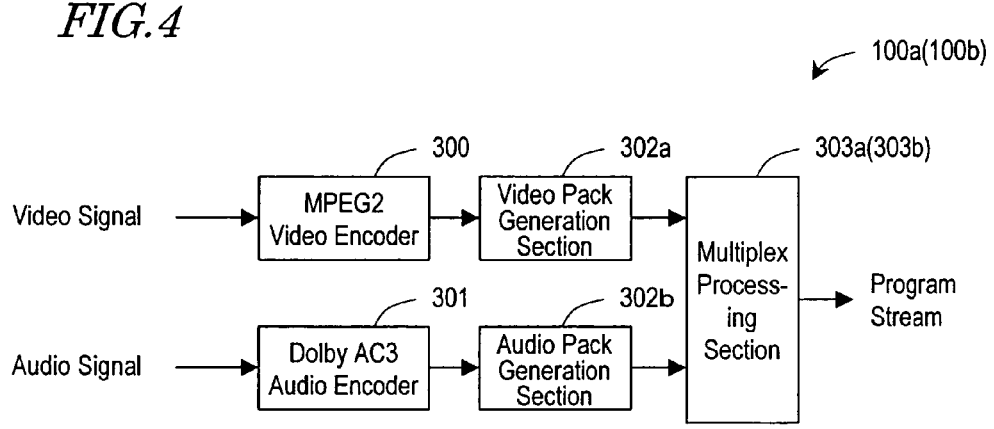

Next, the specific structures of the respective encoders will be described. FIG. 4 shows an exemplary structure of functional blocks in the PS (video) encoder 100a. The PS (video) encoder 100a generates a Video-compliant stream 10b to be recorded onto a DVD-R medium (FIG. 1(b)). The PS (video) encoder 100a includes: an MPEG2 video encoder 300 for performing an encoding process for a video signal; a Dolby AC3 audio encoder 301 for performing an encoding process for an audio signal; a video pack generation section 302a; an audio pack generation section 302b; and a multiplex processing section 303a. The MPEG2 video encoder 300 subjects an incoming video signal to a compression/encoding process. The video pack generation section 302a and the audio pack generation section 302b store the resultant video encoded data in video packs of 2 kbytes each. On the other hand, the Dolby AC3 encoder subjects an incoming audio signal to a compression/encoding by the Dolby AC3 scheme. Then, the audio pack generation section 302b stores the resultant audio data in audio packs of 2 kbytes each.

The packed video and audio encoded data are multiplexed by the multiplex processing section 303a, and output as an MPEG program stream. In the multiplex process, the multiplex processing section 303a adds navigation packs 11b as shown in FIG. 1(b).

Thus, the PS (video) encoder 100a subjects the input signals to a recording process onto the storage medium, in the form of an MPEG program stream of 2 kbyte packs. Note that a "pack" is known as an exemplary form of a packet.

Next, the structure of the PS (VR) encoder 100b will be described. Based on the input signals, the PS (VR) encoder 100b generates a VR-compliant stream 10a to be recorded onto a DVD-RAM medium (FIG. 1(a)). The main structure of the functional blocks of the PS (VR) encoder 100b is generally the same as the structure of the PS (video) encoder 100a shown in FIG. 4. In FIG. 4, "100b" is also indicated to mean "PS (VR) encoder". Note also that the multiplex processing section 303b in the PS (VR) encoder adds RDI packs 11a as shown in FIG. 1(a), instead of navigation packs. Although the recording format of management data on the medium may in some parts differ rather than being completely identical, the description thereof will be omitted because no particular problem will arise for the purpose of describing the present invention.

Figure 5:
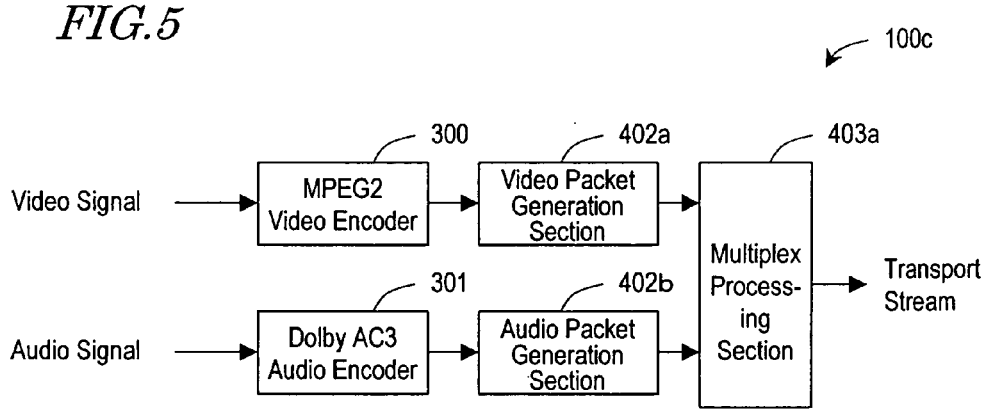
FIG. 5 is a diagram showing exemplary structure of functional blocks in a TS encoder 100c.

Next, the TS encoder 100c will be described. FIG. 5 shows an exemplary structure of the functional blocks in the TS encoder 100c. The TS encoder 100c generates a transport stream (TS) to be recorded onto a BD medium (FIG. 2). The TS encoder 100c includes an MPEG2 video encoder 300, a Dolby AC3 audio encoder 301, a video packet generation section 402a, an audio packet generation section 402b, and a multiplex processing section 403.

The MPEG2 video encoder 300 and the Dolby AC3 audio encoder 301 are identical to the PS (video) encoder 100a.

Based on the video encoded data which is output from the MPEG2 video encoder 300, the video packet generation section 402a generates packets of 188 bytes each. Moreover, based on the audio encoded data which is output from the Dolby AC3 audio encoder 301, the audio packet generation section 402b generates audio packets of 188 bytes each. The multiplex processing section 403 multiplexes the video packets and audio packets, and outputs them as a transport stream. The TS encoder 100c records the program data in a transport stream as a single AV file, and records it in such a format that its attribute information is kept under management on AV unit basis. Note that, although the transport stream shown in FIG. 2 includes other types of packets other than video and audio packets, any structure for generating such packets is not explicitly shown in FIG. 5.

Next, various kinds of data and management information which will be stored onto storage media through a splice-recording by the recording apparatus 30 will be described. In the following description, it is assumed that the storage media are a DVD-R medium and a hard disk.

Figure 6:
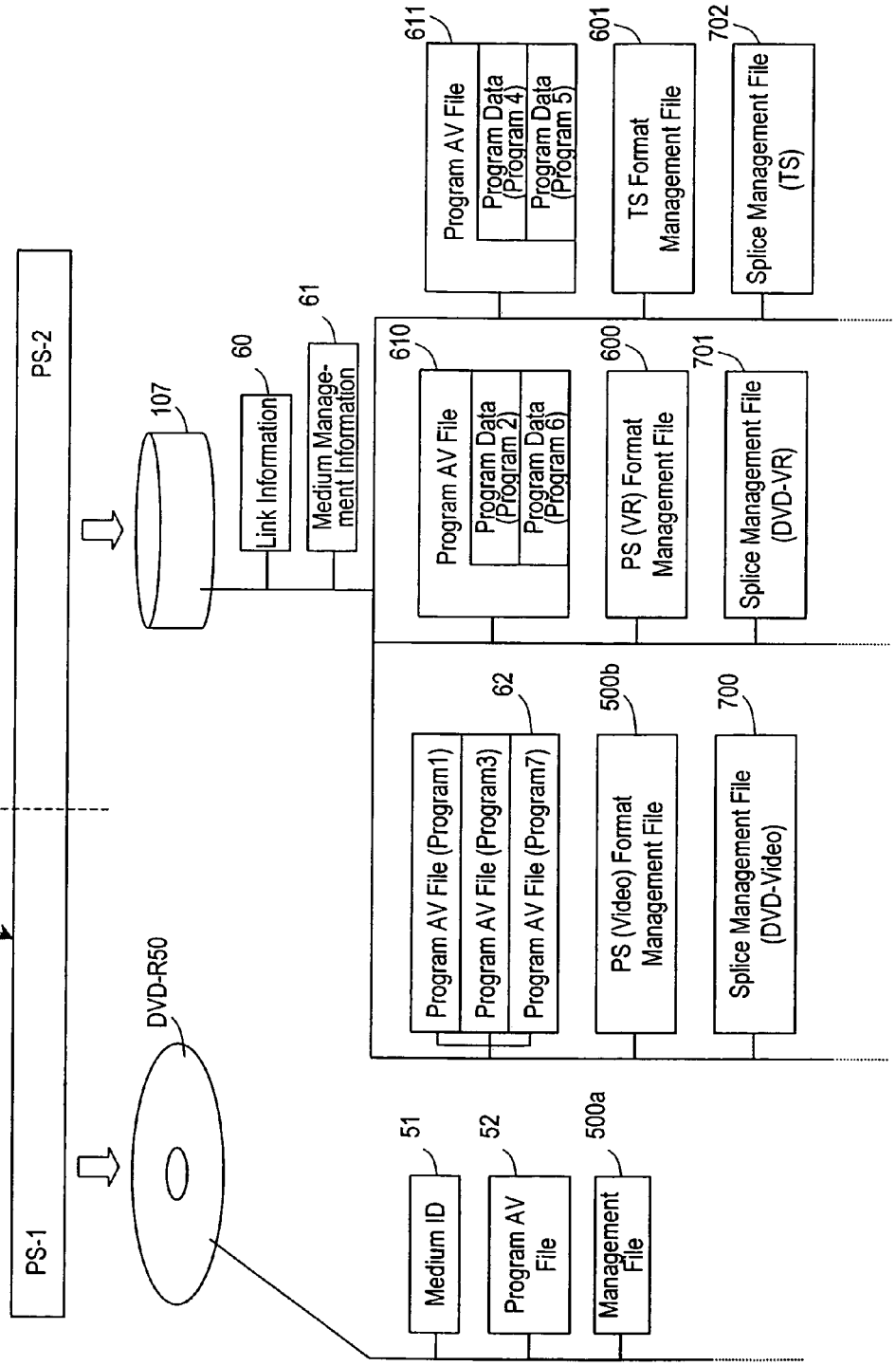
FIG. 6 is a diagram showing the respective data structures of a DVD-R medium 50 and a hard disk drive 107 after a splice-recording has been performed.

FIG. 6 shows the respective data structures of the DVD-R medium 50 and the hard disk drive 107 after a splice-recording. Suppose that, out of the Video-compliant program stream of one program:, a portion (PS-1) including the beginning of the stream is first written on the DVD-R medium 50, and then a subsequent portion (PS-2) is written on the hard disk. Note that "one program" refers to what is recorded through a single instance of recording process, from the start to end of recording.

At the end of the splice-recording, a medium ID 51, a program AV file 52, a management file 500a, and the like will have been stored to the DVD-R medium 50. The medium ID 51 is information which is unique to the DVD-R medium 50 for identifying the DVD-R medium 50. The medium ID 51 may be recorded in non-rewritable fashion at shipment of the medium, or may be written by the recording apparatus 30 as will be described later. The program AV file 52 is a file containing the stream PS-1 of the program. Although only one program AV file is shown in the figure, a program AV file(s) of the program stream(s) of any other program(s) may also be contained. The management file 500a stores the stored position of the program AV file 52, time information, and the like. The detailed data structure of the management file 500a will be described later with reference to FIG. 8.

On the other hand, in the hard disk which is provided in the hard disk drive 107, link information 60, medium management information 61, program AV files 62, etc., format management files (500b, 600) of the respective streams, a splice management file 700, and the like are stored.

In the link information 60, stored addresses (on the hard disk) of the respective files are described. The link information 60 will be referred to when reading the medium management information 61, format management files (500b, 600, 601) and the splice management files (700, 701, 702) for the respective-streams, for example. The medium management information 61 is provided in order to correlate the PS-1 and PS-2, which are written so as to be split between the DVD-R medium 50 and the hard disk. Each program AV file is a file containing a stream of a program. For example, the program AV file 62 is a file storing the program stream PS-2. The management file 500b is provided correspondingly to the hard disk drive 107, and has a basic format (data structure) which is identical to that of the management file 500a (which is present on the DVD-R medium 50), but may also contain any additional data. In the splice management file 700, information which is necessary for playing back a program that is a target of splice-recording is described. The data structures of the medium management information 61, the format management files, and the splice management files will be described later with reference to FIGS. 8 to 10.

When performing plural instances of splice-recording, a user may use removable storage media of different types. For example, in the case of recording two programs, the first program may be subjected to a splice-recording using a DVD-R medium and the hard disk, whereas the next program may be subjected to a splice-recording using a BD medium and the hard disk. In that case, AV files storing data streams of different formats will be diversely present on the hard disk. In addition, format management files and splice management files corresponding to such diverse data streams will also be provided correspondingly to the respective formats. As a result, according to the present embodiment, it is possible that program AV files corresponding to three kinds of data streams may be present on the hard disk. As a method for storing management data on the hard disk, however, it would also be possible to record the management files in a unified data structure which is independent of such three recording formats.

In FIG. 6, for example, Video-compliant program streams are stored in the program AV files of programs 1, 3 and 7, and corresponding to these program AV files, the PS (video) format management file 500b and the splice management file 700 (which is DVD-Video-compliant) are provided. A program AV file 610 which contains program data of programs 2 and 6 contains VR-compliant program streams, and the PS (VR) format management file 600 and the splice management file 701 (which is DVD-VR-compliant) are provided corresponding to this program AV file. Furthermore, an program AV file 611 which contains program data of programs 4 and 5 contains transport streams, and the TS format management file 601 and the splice management file 702 are provided corresponding to this program AV file.

Figure 7:
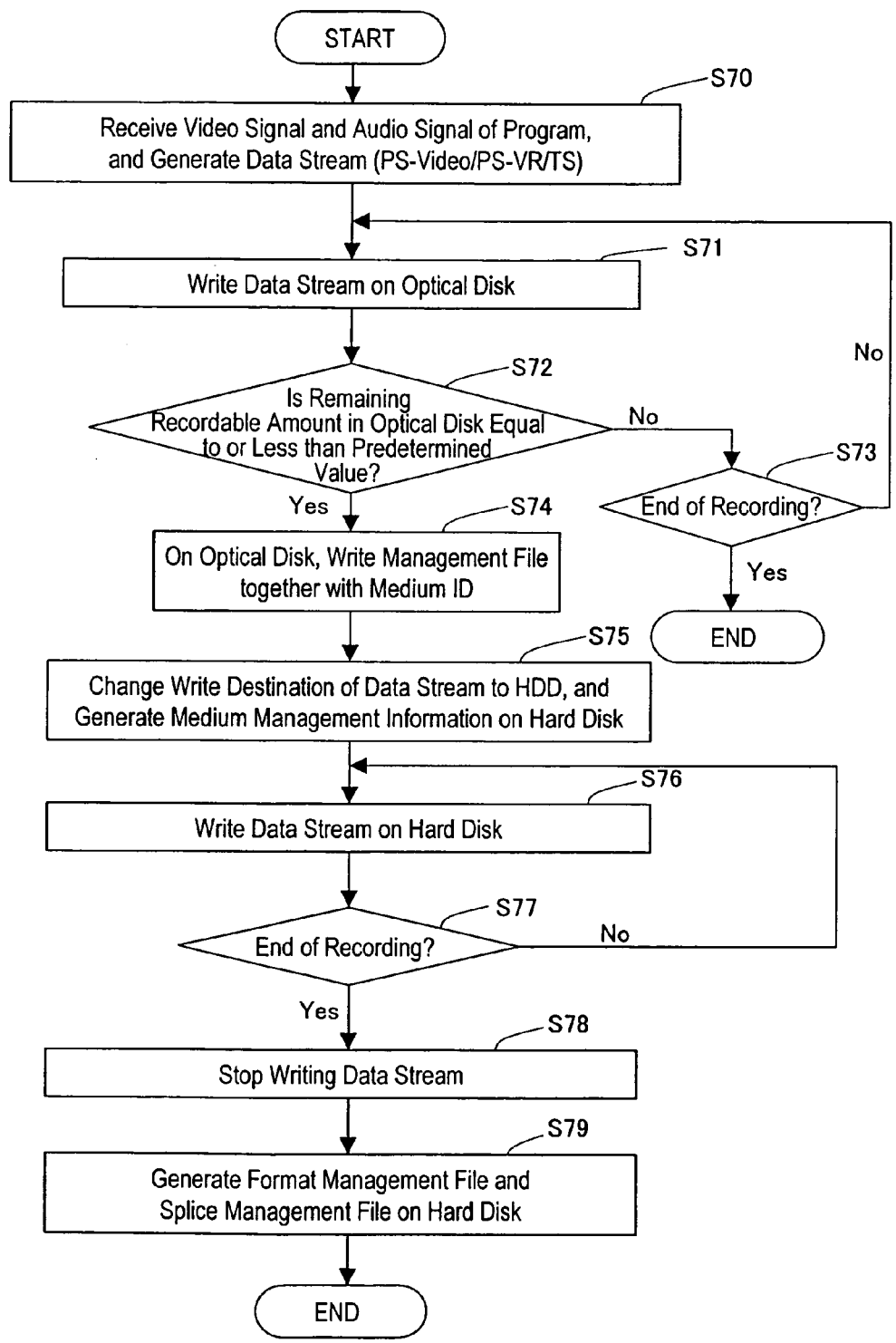
FIG. 7 is a diagram showing the procedure of a recording process by the recording apparatus 30.

Next, with reference to FIG. 7, the processing by the recording apparatus 30 will be described. FIG. 7 shows the procedure of a recording process by the recording apparatus 30. It is assumed that, prior to starting the below-described process, an optical disk is already loaded in the recording apparatus 30, and that the type of this optical disk has been determined by the medium determination section 105. It is assumed that the optical disk is a DVD-R.

At step S70, when program signals (a video signal and an audio signal) are input to the recording apparatus 30, the selector 110a selects one of the encoders 100a to 100c to output the program signals based on an instruction from the recording format selection section 103. Since a DVD-R is loaded, the recording format selection section 103 instructs to select the PS (video) encoder 100a. As a result, a Video-compliant stream is generated by the PS (video) encoder 100a. The process advances to step S71.

At step S71, the optical disk drive 104 writes the Video-compliant stream on the DVD-R medium 50. At step S72, the remaining capacity detection section 106 determines whether or not the remaining recordable amount in the optical disk is equal to or less than a predetermined value. If it is equal to or less than the predetermined value, the process advances to step S74; if it is greater than the predetermined value, the process advances to step S73.

At step S73, the recording apparatus 30 determines whether the end of recording has been reached or not. For example, this determination is made based on whether or not the inputting of program signals has been ended, or whether or not the recording end time has been reached. If it is the end of recording, the recording process is ended; if the recording is not to be ended, the process returns to step S71.

Figure 8:
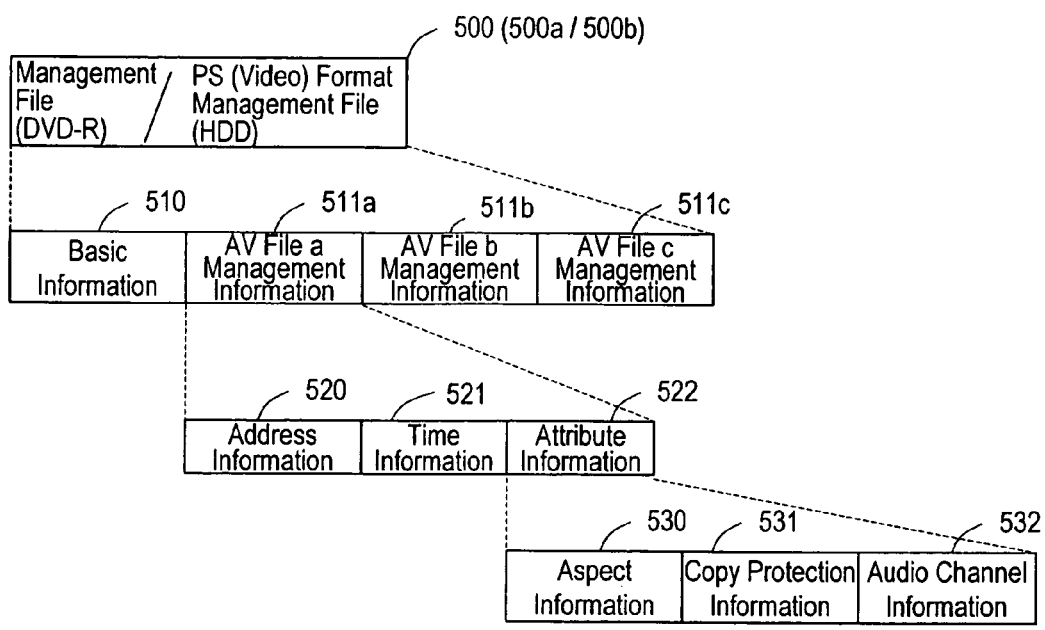
FIG. 8 is a diagram showing the data structure of management files 500a/500b.

At step S74, the optical disk drive 104 writes the management file 500a, together with the medium ID 51 (FIG. 6), on the DVD-R medium 50. FIG. 8 shows the data structure of the management files 500a/500b. The file which has been written on the DVD-R medium 50 is the management file 500a, and the file which has been written on the DVD-R medium 50 is the PS (video) format management file 500b. In connection with the description of FIG. 8, any description that common applies to both management files 500a and 500b will simply refer to the "management file 500". The management file 500 is composed of basic information 510, and AV file management information 511a, 511b, and 511c corresponding to the respective programs, and the like. Note that FIG. 8 illustrates three pieces of AV file management information 511a, 511b and 511c; this means that three recorded contents exist on the DVD-R medium 50. In the case where one recorded content exists on the DVD-R medium 50, there will be one piece of AV file management information.

The basic information 510 contains basic information concerning the entire storage medium, e.g., the number of AV files and total recording duration.

The AV file management information 511a includes address information 520, time information 521, and attribute information 522. The address information 520 contains information identifying the beginning address, last address, etc., of the recorded AV file. The time information 521 contains time-related information, e.g., the point in time of recording and the recorded duration.

The attribute information 522 is information indicating the attributes of the input signals, and contains aspect information 530, copy protection information 531, and audio channel information 532, for example. The various kinds of information composing the attribute information 522 are previously superposed on the input signals. For example, the PS (video) encoder 100a extracts the various kinds of information from the input signals when generating a Video-compliant stream, and places them in the Video-compliant stream. The aspect information 530 is information for distinguishing between 4:3, 16:9, and letterbox as aspect information of the recorded video data. The copy protection information 531 is information for copy protection control, e.g., copy-free or copy-prohibited. The audio channel information 532 is information for distinguishing monaural (1 channel), stereo (2 channels), dual-monaural (1+1 channels), etc., as channel information of the recorded audio data.

Figure 9:
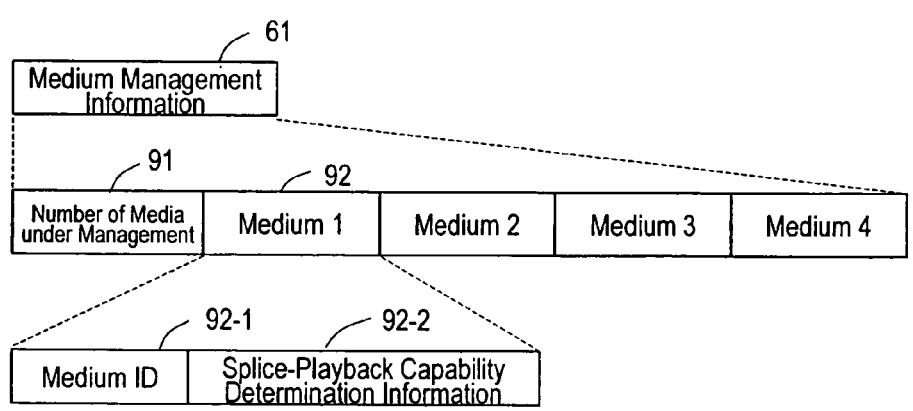
FIG. 9 is a diagram showing the data structure of medium management information 61.

At step S75 in FIG. 7, based on an instruction from the medium selection section 108, the selector 102 changes the write destination of the Video-compliant stream on the hard disk drive 107. Moreover, the hard disk drive 107 generates medium management information 61 on the hard disk. FIG. 9 shows the data structure of the medium management information 61. The medium management information 61 includes information 91 indicating the number of media to be managed and medium information 92 which is provided with respect to each medium.

The medium information 92 includes a medium ID 92-1 and splice-playback capability determination information 92-2. The medium ID 92-1 is the same information as the medium ID 51 shown in FIG. 6. The splice-playback capability determination information 92-2 may be, for example, nothing but the management file 500 in a splice-recording, or a value indicating a point in time at which the management file 500 was recorded onto the optical disk. When continuously playing back splice-recorded data streams (described later), the determination information 92-2 is used to determine whether there is any inconsistency between the information of the optical disk as managed in the hard disk drive 107 (information of the splice management file) and the state of the program data on the optical disk which is mounted during playback, that is, whether the two match or not. The reason why the determination information 92-2 is provided is that, if the storage medium is taken out after a splice-recording and receives erasure, editing, etc., of its program data on another recorder, the stored address or program number will no longer exist, or be changed, thus making it impossible to access the program data by utilizing the program data from immediately after the splice-recording and the management information thereof.

Note that a user-chosen disk name may be described in the medium ID in the medium management information 61. As a result, when the substance of the medium management information 61 is displayed, for example, the user will be able to easily identify the medium.

At step S76 of FIG. 7, the hard disk drive 107 writes the Video-compliant stream on the hard disk. Note that, even if the write destination is changed from the DVD-R medium 50 on the hard disk, there is no change in the fact that the PS (video) encoder 100a continues to generate the Video-compliant stream.

At step S77, the recording apparatus 30 determines whether the end of recording has been reached or not. This determination is the same as the determination of step S73. If it is the end of recording, the process advances to step S78; if the recording is not to be ended, the process returns to step S76 to further continue the recording.

At step S78, the hard disk drive 107 stops writing the Video-compliant stream. The PS (video) encoder 100a also ends generation of the Video-compliant stream.

At step S79, the recording apparatus 30 generates a format management file and a splice management file, and writes them on the hard disk.

The format management file stores, in the same data structure as that of the management file 500 which has been described with reference to FIG. 8, the same type of information. By referring to the format management file, it is possible to play back any program AV file that is stored on the hard disk while splice-playback is not being performed. By referring to the format management file, it is possible to identify the stored address, time of recording, recording duration, and the like of each AV data file on the hard disk. Since attribute information is also described, it is possible to identify the aspect, copyability, and audio channels of the AV file. The difference between the two is that the format management file is provided on the hard disk after a splice-recording is ended, whereas the management file 500 is provided, when the recording destination medium is switched during a splice-recording, on the storage medium upon which the recording was being conducted first (i.e., the optical disk in the present embodiment).

Figure 10:
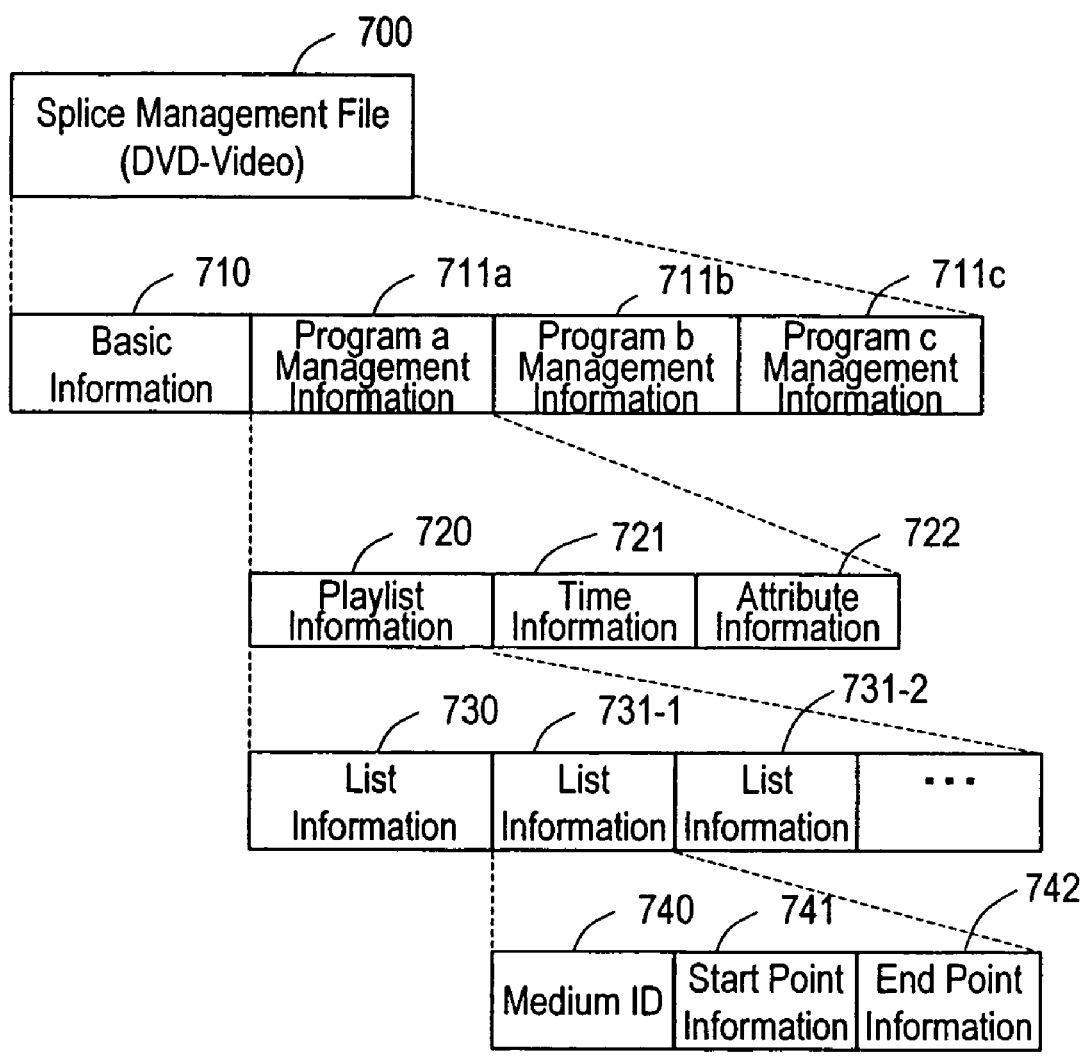
FIG. 10 is a diagram showing the data structure of a splice management file 700.

On the other hand, the splice management file stores information for performing a splice-playback. FIG. 10 shows the data structure of the splice management file 700. The splice management file 700 contains: basic information 710, which is information for keeping the entire hard disk under management; and management information 711a, 711b and 711c of respective programs which were targets of splice-recording. In the following description, the program which became a target of splice-recording according to the present embodiment is assumed to be "program a". In FIG. 10, the management information 711a relates to program a, whereas the management information 711b and 711c relate to other programs. In the present embodiment, the program a, which was the target of splice-recording, is recorded so as to be split between the DVD-R medium 50 and the hard disk. Therefore, for description's sake, the portion of program a which is present on the DVD-R medium 50 will be referred to as a first portion, whereas the remaining portion of program a which is present on the hard disk will be referred to as a second portion. Note that each such portion of the program data may also be referred to as sub-AV data or a playlist. In other words, in the present embodiment, the data of program a which has been splice-recorded consists of two playlists, which are respectively stored to the DVD-R medium 50 and the hard disk as program AV files.

The management information 711a of program a includes playlist information 720, time information 721, and attribute information 722. The time information 721 is information concerning the time of recording and recording duration, whereas the attribute information is information concerning the attributes of the AV data of program a.

The playlist information 720 includes list management information 730 and list information 731-1 and 731-2. The list management information 730 contains general information concerning each playlist, e.g., the number of playlists in program a. In list information 1 (731-1), information identifying the first portion of program a, which is present on the DVD-R medium 50, is defined. In list information 2 (731-2), information identifying the second portion of program a, which is present on the hard disk, is defined.

Specifically speaking, list information 1 (731-1) includes medium ID information 740, start point information 741, and end point information 742. The medium ID 740 is information for identifying the storage medium. Since the first portion of program a is present on the DVD-R medium 50, information identifying the DVD-R medium 50 is described in the medium ID 740. The start point information 741 and the end point information 742 identify from which position to which position on the DVD-R medium 50 the first portion of program a is stored. The start point information 741 and the end point information 742 may also be represented by addresses on the DVD-R medium 50.

Note that the start point information 741 and the end point information 742 may also be represented by the playback duration of program a. In the case where they are represented by the playback duration, a presentation time stamp (PTS) as defined under MPEG may be utilized. For example, so far as video is concerned, the PTS of each I picture which is placed at the beginning of a GOP according to the MPEG standard may be adopted as the playback duration. Note that, in order to identify the start point and end point of program a in terms of playback duration, a time-address conversion table (not shown), also defined under MPEG, may also be utilized. In a time-address conversion table, time stamps (PTS) representing time and pack numbers indicating addresses are mapped to each other. A pack number is the number of a pack in which the beginning data of an I picture which is to be played back at a point in time corresponding to that PTS.

Furthermore, the start point information 741 and the end point information 742 may be a program number, by which the program may be uniquely identified. A program number is a piece of information which is independently generated for the data of a program on each medium, irrespective of whether the program data of a given program has been recorded on different media through a splice-recording or not.

Although the present embodiment has illustrated a process in the case where a splice-recording is performed by using the DVD-R medium 50 and the hard disk, this is only exemplary. Instead of the DVD-R medium 50, a DVD-RAM medium or a BD medium may be used, together with a hard disk, to perform a splice-recording.

For example, a splice-recording using a DVD-RAM medium will be considered. FIG. 11(a) shows the PS (VR) format management file 600 which is provided on the hard disk when a splice-recording is performed by using a DVD-RAM medium. Note that a management file of the same data structure is also to be provided on the DVD-RAM.

The management file 600 contains basic information 601, management information 602a, 602b and 602c of respective programs, and the like. The basic information 601 contains basic information concerning the entire medium, e.g., the number of recorded programs on the hard disk and total recording duration. The management information 602a, 602b and 602c of the respective programs contain the time of recording, recording duration, address information, and the like of the respective programs.

On the other hand, FIG. 11(b) shows the data structure of a program AV file 610 which is generated on the hard disk. Similarly to the aforementioned management file, a program AV file (not shown) of a program which became the target of program AV file splice-recording is also recorded on the DVD-RAM. First, the PS (VR) encoder 100b generates a VR-compliant MPEG program stream which is composed of 2 kbyte-packs. The stream is stored in a single AV file. Even if there exists a plurality of recorded programs, they are to be kept under management in a single AV file. The stream of each program is divided into predetermined AV units, and the attribute information is kept under management on an AV unit basis. Note that the data corresponding to the first portion of the program which became the target of splice-recording is written on the DVD-RAM, whereas the data corresponding to the second portion of that program is written on the hard disk. These are both VR-compliant program streams.

In the AV file 610 shown in FIG. 11(b), AV data 611a of program a, AV data 611b of program b, and AV data 611c of program c are shown. This indicates that, as a result of performing three instances of recording, AV data of three programs has been stored. Since they all have similar data structures, the data structure of the AV data 611a will be described as an example below.

The AV data 611a consists of unit information 620a, 620b, 620c and 620d, as well as AV units 621a, 621b, 621c and 621d. The AV units are AV data being divided per predetermined time. The unit information 620a contains information for keeping each AV unit under management, and includes address information 630, time information 631, and attribute information 632 for each AV unit. These define data structures similar to their namesake constituent elements shown in FIG. 8 (address information 520, time information 521, and attribute information 522); therefore, descriptions thereof are omitted. The attribute information 632 contains aspect information 640, copy protection information 641, and audio channel information 642, as information indicating the attributes of the AV unit 621a. The respective pieces of information contained in the attribute information 632 also define data structures similar to their namesake constituent elements shown in FIG. 8 (aspect information 530, copy protection information 641, and audio channel information 632); therefore, descriptions thereof are omitted.

Next, a variant concerning the setting of the attribute information 522 shown in FIG. 8 will be described. In the above description, it was assumed that the various kinds of information composing the attribute information 522 are previously superposed on the input signals, and are extracted by the PS (video) encoder 100a so as to be set in the Video-compliant stream. As a result, as shown in FIG. 8, the attribute information 522 is managed per each program. However, this implies that only one piece of attribute information can be retained for one program.

On the other hand, the attributes of the incoming signals may vary with time. For example, as for the audio channels, a bilingual broadcast program has dual-monaural audio, but commercial messages and the like have stereo audio. It would be preferable that the attribute information can be set and managed so that, even in the case where the audio channels or the like have changed in the middle of recording, the attributes of that signal can be changed.

The recording apparatus 30 has the attribute information setting user interface 111. By using the interface 111, the user can select attribute information. Specifically, the attribute information setting user interface 111 allows the user to makes settings such that the main-audio (left channel) or the sub-audio (right channel) will be recorded in the case of dual-monaural audio. For example, the audio channels of the input signal can be set so that the 2-channel (stereo) audio will always be recorded, and that the main-audio will be recorded in the case of dual-monaural audio. If the audio channels of the input signal switch to dual-monaural audio in the middle of a recording, the PS (video) encoder 100a will replace the audio on the right channel with the audio of main-audio (left channel), thus recording 2-channel audio. As a result, even if the audio attributes of the input signal are changed, it is possible to perform recording without changing the attribute information of the recorded data.

The same is also true of the aspect information (of the video signal) composing the attribute information. The user sets the aspect of recorded data via the attribute information setting user interface 111. For example, if the user has set it to 4:3, recording will be performed at 4:3 even if the attribute information of the input signal changes to 16:9 in the middle of a recording. The same is also true of copy protection information, which is also attribute information, but it would be preferable that a piece of copy protection information which has a copy-prohibited attribute cannot be changed to become copy-allowable. The manufacturer of the recording apparatus 30 can individually set whether changes of the attribute information are possible or not.

Figure 11:
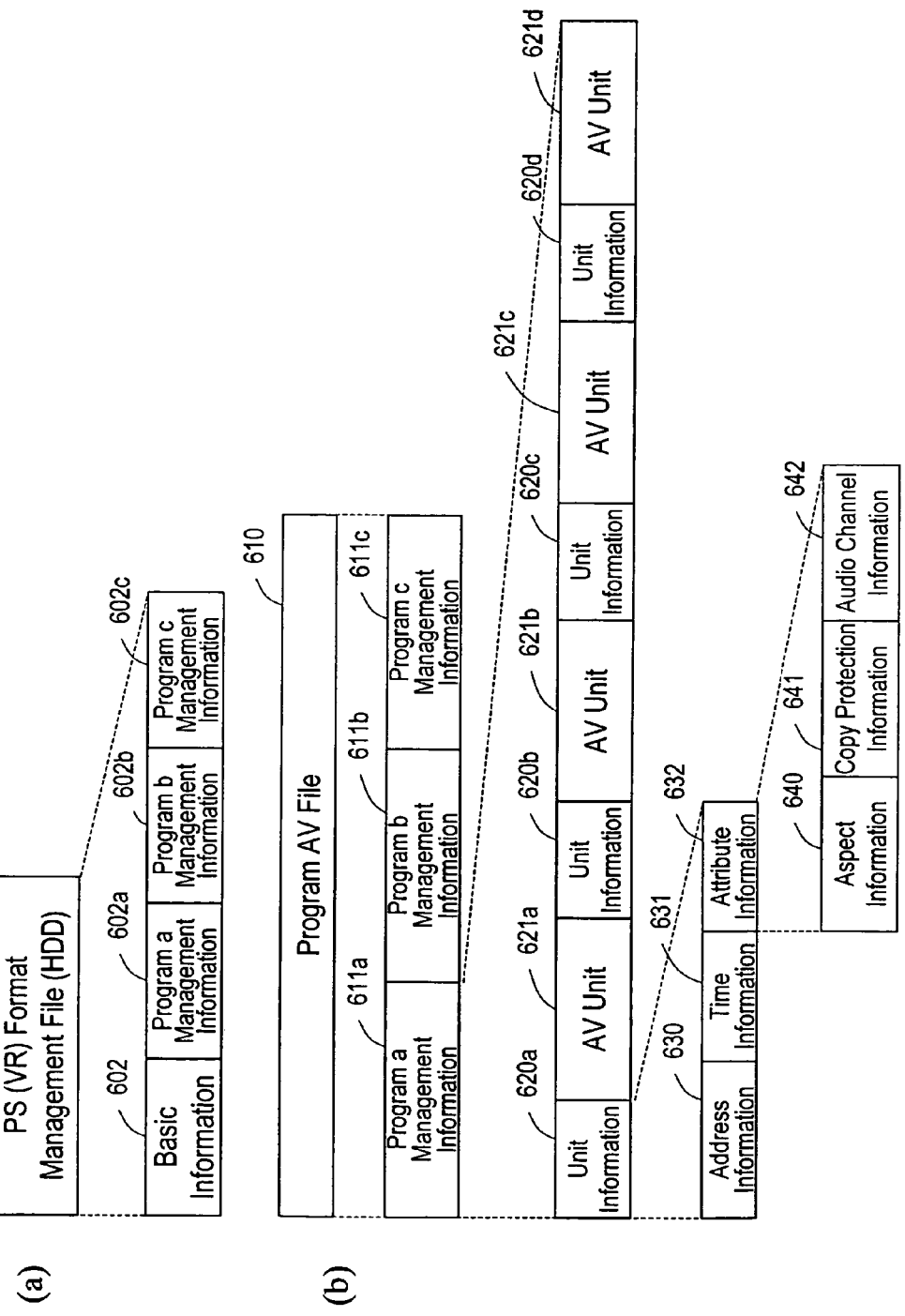
FIG. 11(a) is a diagram showing a management file 600 in the case where a splice-recording has been performed by utilizing a DVD-RAM medium.
FIG. 11(b) is a diagram showing the data structure of a program AV file 610 which is generated on a DVD-RAM and a hard disk.

The recording apparatus 30 may be arranged so that setting of attribute information via the attribute information setting user interface 111 is applicable not only to the processing by the PS (video) encoder 100a, but also the processing by the PS (VR) encoder 100b and the TS encoder 100c. For example, although the attribute information 632 as shown in FIG. 11 is managed with respect to each AV unit 621a, by changing the attribute information of the corresponding AV unit via the interface 111, it would become possible to record the same attribute information as the attribute information of the input signals. The attribute information detection section 112 would extract attribute information from the input signals, and input attribute information that matches the content of the setting to the PS (VR) encoder 100b and the TS encoder 100c. As a result, that attribute information would be recorded as the attribute information 632 in the unit information of the corresponding AV unit.

In the present embodiment, the timing of changing the recording destination is determined based on the remaining capacity of the optical disk. However, the user may be allowed to arbitrarily select the timing with which to perform a splice-record, by using the medium selection user interface 109 which is provided in the recording apparatus 30. The interface 109 is a button(s) on the main body or a remote control, and may more specifically be a button for instantaneously executing a change of the recording destination, or a button that can previously set a point in time at which a change of the recording destination will be executed.

Note that the link information, format management files, and splice management files can be retained in an SRAM (not shown) or the like, instead of the hard disk.

Figure 12:
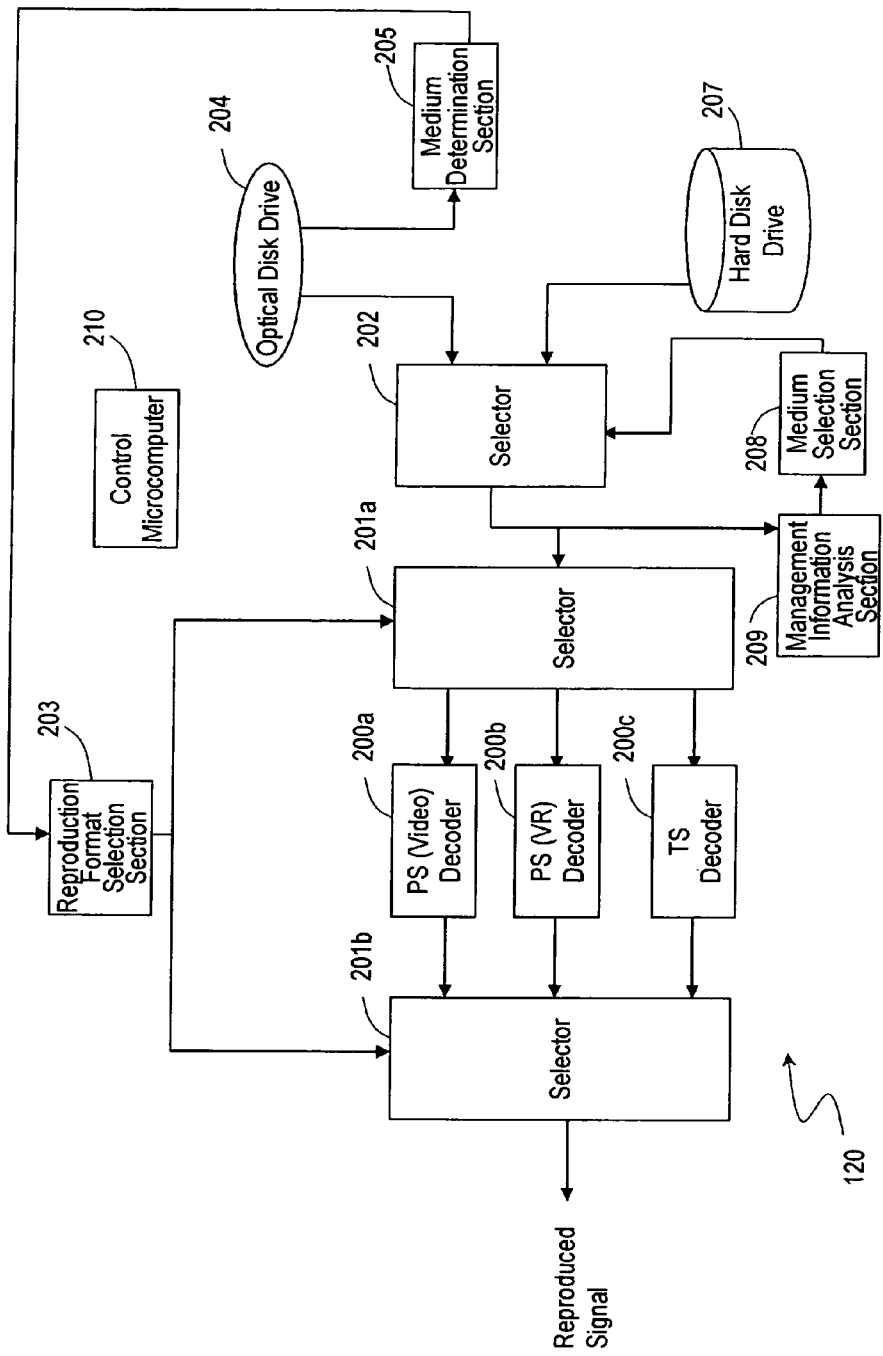
FIG. 12 is a diagram showing the structure of functional blocks in a playback apparatus 120 according to the present embodiment.

Next, with reference to FIG. 12 to FIG. 15, a playback apparatus which performs a splice-playback according to the present embodiment, and the processing thereof, will be described. First, FIG. 12 shows the structure of functional blocks in a playback apparatus 12 according to the present embodiment. In many cases, the recording apparatus 30 shown in FIG. 3 would also have the functions of the playback apparatus 120. In the case where the hard disk drive 107 is internalized in and cannot be detached from the recording apparatus 30, it can be said that the recording apparatus 30 and the playback apparatus 120 are provided within the same housing.

The playback apparatus 120 comprises a PS (video) decoder 200a, a PS (VR) decoder 200b, a TS decoder 200c, selectors 201a, 201b and 202, a reproduction format selection section 203, an optical disk drive 204, a medium determination section 205, a hard disk drive 207, a medium selection section 208, a management information analysis section 209, and a control microcomputer 210. The playback apparatus 120 is capable of playing back video and/or audio from program data which is written on a storage medium.

It is assumed hereinbelow that a splice-recording has been performed by the above-described recording apparatus 30, using the DVD-R medium 50 and the hard disk. In other words, on the DVD-R medium 50, the medium ID file 51, the program AV file 52 and the management file 500a as shown in FIG. 6 are present. On the other hand, on the hard disk, the link information 60, the medium management information 61, the program AV file 62, the PS (video) format management file 500b, and the splice management file 700 as shown in FIG. 6 are present. The substance of each of the aforementioned files is as shown in FIG. 8 to FIG. 11 and the like.

First, the main operation of the playback apparatus 120 will be briefly described. The following operation is to be performed based on instructions from the control microcomputer 210. The optical disk drive 204 of the playback apparatus 120 reads the medium ID 51 from the DVD-R medium 50. Next, the hard disk drive 207 reads the medium management information 61 from the hard disk. Then, the management information analysis section 209 determines whether the medium ID 51 of the DVD-R medium 50 matches the medium ID 92-1 of the medium management information 61. If they match, it is further determined whether the current state of the first portion of the program data matches the state of the first portion at the time of writing, which is identified by the splice-playback capability determination information 92-2 in the medium management information.

If the states match, the PS (video) decoder 200a reads the first portion from the DVD-R medium 50 and decodes it. As a result, the playback apparatus 120 outputs reproduced signals of the video and/or audio. Once the decoding of the first portion on the DVD-R medium 50 is ended, the PS (video) decoder 200a next reads the second portion, which is present on the hard disk, and decodes it. As a result, reproduced signals of the second portion are output.

Respective constituent elements of the recording apparatus 30 will be described. The operation of each constituent element is controlled based on instructions from the control microcomputer 120.

The PS (video) decoder 200a performs an opposite process of that of the PS (video) encoder 100a of the recording apparatus 30. In other words, the PS (video) decoder 200a reads the management file 500 as shown in FIG. 8, and acquires management information (e.g., the AV file management information 511a) of an AV file which is the target of read, together with the basic information 510. By utilizing these, the PS (video) decoder 200a identifies the Video-compliant stream, separates its video packets and audio packets, and extracts video data and audio data from each packet. The encoded video frames and audio frames which are thus obtained are decoded, and output as reproduced signals. Similarly to the PS (video) decoder 200a, the PS (VR) decoder 200b and the TS decoder 200c also perform opposite processes of the PS (VR) encoder 100b and the TS encoder 100c, respectively, and output reproduced signals.

Based on an instruction from the reproduction format selection section 203, the selectors 201a and 201b select either one of the three decoders 200a, 200b and 200c to perform a decoding process.

The reproduction format selection section 203, which is controlled based on the output from the medium determination section 205, determines which one of the three decoders 200a, 200b and 200c is to be selected, and instructs the selectors 201a and 201b. Specifically, the reproduction format selection section 203 instructs to select the PS (video) decoder 200a when the optical disk which is loaded in, the optical disk drive 204 is a DVD-R medium, instructs to select the PS (VR) decoder 200b if it is a DVD-RAM medium, and instructs to select the TS decoder 200c if it is a BD medium. Note that the determination as to which decoder should be selected may be made by identifying the format of the data stream from the optical disk which is loaded in the optical disk drive 204.

It is assumed that the optical disk drive 204 and the hard disk drive 207 are identical to the optical disk drive 104 and the hard disk drive 107 of the recording apparatus 30.

The medium determination section 205 determines the type of the optical disk which is loaded in the optical disk drive 204. The playback apparatus 120 determines whether a DVD-R medium, a DVD-RAM medium, or a BD medium is inserted. The determination process by the medium determination section 205 is similar to the process of the medium determination section 105 in the recording apparatus 30, and therefore will not be described herein.

The selector 202 selects which one of the optical disk drive 204 and the hard disk drive 207 the data is to be read from. The selector 202 is controlled by the medium selection section 208.

The medium selection section 208 is controlled by the management information analysis section 209, which analyzes various kinds of management information. In the present embodiment, a splice management file (FIG. 10) is read from the hard disk, and in accordance with the medium ID 740 in the playlist information 720, either the optical disk drive 204 or the hard disk drive 207 is selected as a medium from which playback is to be performed.

The playback apparatus 120 is able to play back a program which has been recorded on a single storage medium (normal playback), or continuously play back a program which has been splice-recorded on a plurality of types of storage media (splice-playback). In a normal playback process, while reading program data which is the target of playback from an optical disk or a hard disk, a decoding process which corresponds to the data stream format of that program data is performed. As a result, playback of the program is possible.

Figure 13:
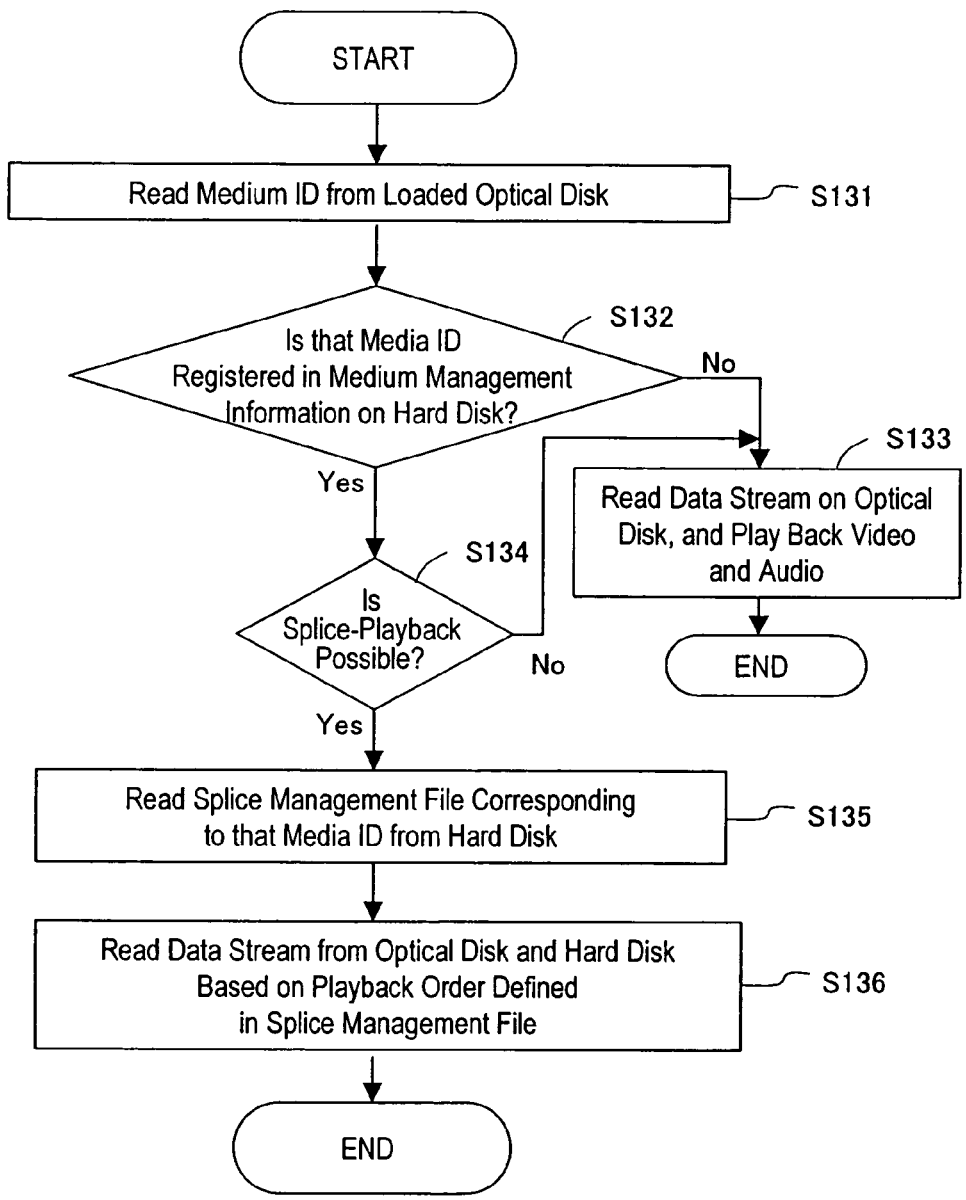
FIG. 13 is a flowchart showing the procedure of a splice-playback process.

Next, with reference to FIG. 13, a splice-playback process which is performed in the playback apparatus 120 will be described. FIG. 13 shows a procedure of the splice-playback process. It is assumed that, prior to starting the below-described process, an optical disk is already loaded in the playback apparatus 120, and that the type of this optical disk has been determined by the medium determination section 205. It is assumed that the optical disk is a DVD-R.

First, at step S131, the optical disk drive 204 reads the medium ID 51 from the loaded optical disk. Also, the hard disk drive 107 refers to the link information 60 and reads the medium management information 61 on the hard disk. The management information analysis section 209 determines whether the medium ID that has been read is registered in the medium management information 61 on the hard disk or not. If it is not registered, the process advances to step S133, and if it is registered, the process advances to step S134. At step S133, the playback apparatus 120 reads a data stream on the optical disk and performs a decoding process corresponding to the data stream format thereof, and reproduces only the program data from the program AV file stored on the optical disk. If any program data is stored on the hard disk, such data would not be regarded as a target of playback because it would be impossible to identify which program data is to be reproduced next subsequent to the program data on the optical disk.

Next, at step S134, the management information analysis section 209 determines whether it is possible to perform a splice-playback or not, based on the splice-playback capability determination information 92-2 in the medium management information 61 and the current state of the program data. For example, if a time of recording the management file 500a on the DVD-R medium 50 is described in the splice-playback capability determination information 92-2, the management information analysis section 209 reads and checks the time against a time stamp which indicates the time of recording of the management file 500a on the DVD-R medium 50. If they match, it is determined that a splice-playback is possible, and the process advances to step S135; if they do not match, it is determined that it is impossible to perform a splice-playback, and the process advances to step S135. The reason for performing the process of step S134 is that, if the time stamps of the management file 500a do not match, it means that the management file 500a and the program AV file 52 on the DVD-R medium 50 have been edited so as to become different from how they were immediately after the splice-recording, thus making splice-playback impossible.

At step S135, the hard disk drive 207 reads from the hard disk a splice management file that corresponds to its medium ID. In the present embodiment, the splice management file 700 concerning a Video-compliant stream is read.

At the next step S136, splice data streams are sequentially read from the optical disk and the hard disk, based on the playback order which is defined in the management file. In connection with this process, the reproduction format selection section 203 sends instructions to the selectors 201a and 201b based on the type of the mounted medium and the stream format of the program data which is the target of reproduction, and thus causes an appropriate decoder to perform processing. As a result, video and audio are played back. Note that, in the case where a splice-recording has been performed and a splice-playback is possible, a notification may be given to the user, and a splice-playback may be executed in accordance with an instruction from the user.

Since the DVD-R medium 50 and the data stream on the hard disk are of the same format, it is possible to continue processing by using the same decoder. In particular, since it is unnecessary to change the decoding process when switching between a playback from the DVD-R medium 50 and a playback from the hard disk, a seamless and continuous playback can be realized.

Figure 14:
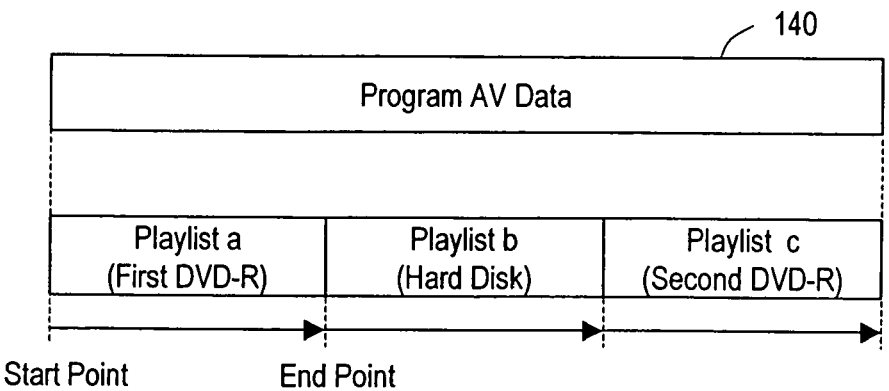
FIG. 14 is a diagram showing a state where a program has been recorded in such a manner as to be split among three storage media.

In the above description, it was assumed that a first portion of a program is recorded first on the DVD-R medium 50, and then a second portion is record on the hard disk during a splice-recording. However, one program may by splice-recorded so as to be split among three or more media. FIG. 14 shows a state where a program has been recorded so as to be split among three storage media. It is assumed that program AV data 140 has respective portions, namely playlists a, b and c. Playlist a exists on the DVD-R medium; playlist b exists on the hard disk; and playlist c exists on a DVD-R medium which is different from the DVD-R medium of playlist a. This situation may appear when, after a recording to a first DVD-R medium is ended, a program keeps being recorded onto the hard disk until a second DVD-R medium is loaded, for example.

In order to identify the storage media, on which the respective playlists are stored, and the start points and end points of playback, the medium ID(s) 740, the start point information 741, and the end point information 742 are described in the list information in the splice management file 700 shown in FIG. 10. For example, list information 731-1 is provided correspondingly to playlist a, describing a medium ID indicating the first DVD-R medium and information indicating the beginning position and end position of playlist a (e.g., addresses on the first DVD-R medium). With respect to playlists a to c, by describing information indicating their beginning positions and end positions as start point information and end point information, it becomes possible to realize a splice-playback from the start of recording until the recording is stopped, without disruptions in the program.

Figure 15:
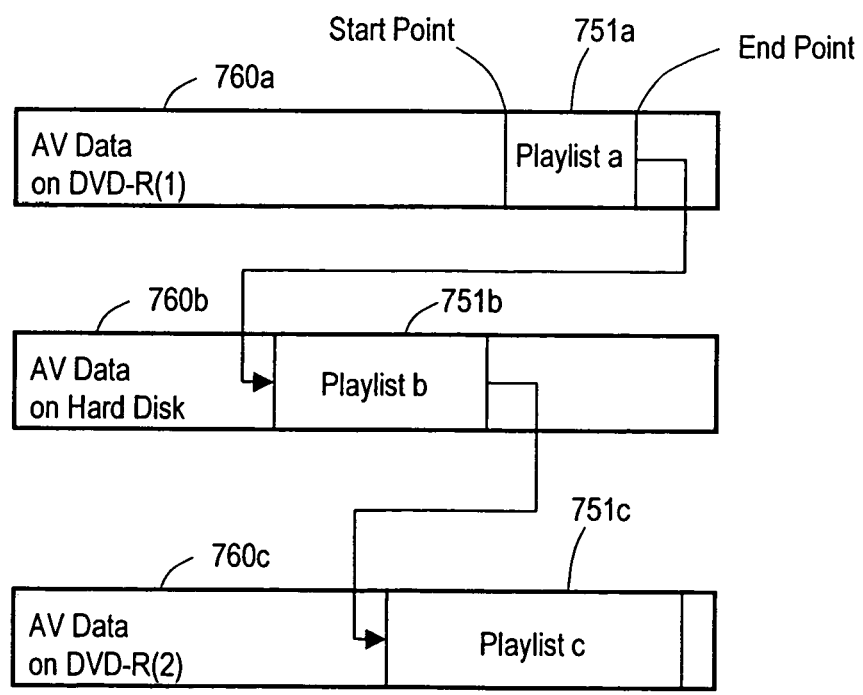
FIG. 15 is a diagram showing a playback path in the case where a program has been recorded in such a manner as to be split among three storage media, and where playlists a to c are set in portions of the program AV data on the respective storage media.

The beginning position and end position of each playlist may be set arbitrarily. FIG. 15 shows a playback path in the case where a program has been recorded so as to be split among three storage media, and playlists a to c are set in portions of the program AV data on the storage media. The situation shown in FIG. 15 may appear in the case where the user performs editing a playlist, which has been set as shown in FIG. 14 immediately after the splice-recording, so as to set a fragment from an arbitrary start point to an arbitrary end point.

Instructions to change playlists, and instructions to set a start point and an end point are sent to the recording apparatus 30 via a remote control or a button (not shown) of the recording apparatus 30 shown in FIG. 3, for example. In accordance with such instructions, the recording apparatus 30 changes the start point information 741 and the end point information 74 in the splice management file shown in FIG. 10.

Note that, when the above-described process has been performed by using the recording apparatus 30, or an editing process such as deletion of program data has been performed, the management file which exists on each storage medium (e.g., the management file 500a of the DVD-R medium 50 shown in FIG. 6) may be rewritten. In such cases, the recording apparatus 30 can also change the descriptions of the splice-playback capability determination information 92-2 in the medium management information 61 which is stored on the hard disk. For example, if a time of recording (of a splice-recording) of the management file 500a on each storage medium is described in the splice-playback capability determination information 92-2, the recording apparatus 30 updates this to a time of recording of the subsequent rewrite. As a result of this, when the time of recording which is described in the splice-playback capability determination information 92-2 and the time stamp of the management file 500a are checked against each other during a splice-playback, the two will match. Therefore, the splice-playback will be performed in such a manner that: playlist a (751a) is first played back from the program AV data on the first DVD-R medium; thereafter, playlist b (751b) is played back from the program AV data on the hard disk; and finally playlist c (751c) is played back from the program AV data on the second DVD-R medium.

Thus, the present embodiment has been described. In the embodiment, the number of stream formats during recording/playback may be any number which is two or greater. The types of recording/playback formats are not limited to those exemplified in the present embodiment, but any type of format may be used so long as it is suitable for the type of the storage medium.

Although the recording apparatus 30 and the playback apparatus 120 were illustrated as having an optical disk drive, in the alternative or in addition, a drive capable of mounting a removable medium such as a semiconductor memory or a magnetic tape medium may be adopted. Although the fixed storage medium was illustrated as a hard disk, any type of fixed storage medium may be used so long as it is a fixed medium drive which is internalized in the apparatus.

The present embodiment has illustrated a splice-recording process from an optical disk to a hard disk as an example. However, it may be a splice-recording process from a hard disk to an optical disk. In such a process, the order of the storage media is simply reversed from that in the process of the present embodiment. During a splice-playback, playback is performed from the hard disk in a reproduction format which is in accordance with the type of the optical disk loaded in the optical disk drive, and then a splice-playback may be performed to the optical disk with a predetermined timing.

Moreover, a splice-playback may be performed from an optical disk to another optical disk. In this case, a reproduction format may be selected in accordance with the type of one of the optical disks, thus playback processes for both optical disks.

The present embodiment has been illustrated on the assumption that splice management files are stored to the hard disk. Alternatively, information identifying the program data on a hard disk to which program data was written (i.e., splice destination), during a splice-recording may be described on an optical disk. In this case, information for determining that information concerning the splice destination is not inconsistent with the state of the hard disk during the splice-recording is required. For example, a unique program number may be assigned to the program data on the hard disk, and based on that program number, consistency with the state of the hard disk during the splice-recording may be determined.

The functions of a data processing apparatus (i.e., the recording apparatus 30 and the playback apparatus 120) according to the present invention are realized based on a computer program defining the processing procedures shown in FIG. 7 and FIG. 13. By executing such a computer program, a computer (control microcomputer) in the data processing apparatus causes the respective constituent elements in the data processing apparatus to operate so as to realize the above-described processes. The computer program may be recorded on a storage medium such as a CD-ROM for market distribution, superposed onto a digital broadcast wave for transmission, or transmitted via an electric communication network such as the Internet. Thus, a computer system can be allowed to operate as a playback apparatus having functions similar to those of the above-described data processing apparatus.

INDUSTRIAL APPLICABILITY

According to the present invention, from among a plurality of types of recording methods, one that is suitable for a type of removable storage medium is selected, and a program is splice-recorded from the removable storage medium to a fixed storage medium, in the same recording format. This makes it unnecessary to switch encoders during a splice-recording. During the playback of a program which has been splice-recorded, it is unnecessary to change the decoding process when switching between the playback from a removable storage medium and the playback from a fixed storage medium, whereby a seamless and continuous playback can be realized.

The invention claimed is:

1. A data processing apparatus capable of writing program data concerning video and/or audio on a first storage medium and a second storage medium, comprising:
    a reception section for receiving a signal concerning the program data;
    a selection section for selecting, from among a plurality of formats, a format which is writable on the first storage medium; and
    a control section for writing the program data on the first storage medium in the selected format, and after writing on the first storage medium is ended, continuing to write the program data on the second storage medium in the format,
    wherein, with respect to a series of said program data written on the first storage medium and the second storage medium, the control section generates splice management information and further writes the splice management information on the second storage medium, the splice management information including: first list information for identifying a first portion of the program data written on the first storage medium; and second list information for identifying a second portion of the program data written on the second storage medium.

2. The data processing apparatus of claim 1, wherein the control section further writes on the second storage medium: an identifier identifying the first storage medium; and medium management information including information which identifies a state, during recording, of the program data written on the first storage medium.

3. The data processing apparatus of claim 1, wherein, the control section generates, as the first list information, an identifier identifying the first storage medium and position information identifying respectively a start position and an end position of the first portion of the program data, and
    as the second list information, an identifier identifying, the second storage medium and position information identifying respectively a start position and an end position of the second portion of the program data.

4. The data processing apparatus of claim 3, wherein the control section generates the position information by utilizing at least one of: addresses on the first storage medium and the second storage medium at which the first portion and the second portion are stored; times of playing back the first portion and the second portion; and information uniquely identifying respectively the first portion and the second portion.

5. The data processing apparatus of claim 4, wherein the first storage medium is an optical disk, and the second storage medium is a hard disk.

6. The data processing apparatus of claim 5, wherein,
    a plurality of types of optical disks are mountable as the first storage medium; and
    the selection section selects a format based on the type of a mounted optical disk.

7. A data processing method capable of writing program data concerning video and/or audio on a first storage medium and a second storage medium, comprising the steps of:
    receiving a signal concerning the program data;
    selecting, from among a plurality of formats, a format which is writable on the first storage medium; and
    writing the program data on the first storage medium in the selected format, and after writing on the first storage medium is ended, continuing to write the program data on the second storage medium in the format,
    wherein, with respect to a series of said program data written on the first storage medium and the second storage medium, the step of writing generates splice management information and further writes the splice management information on the second storage medium, and wherein
    the splice management information includes:
        first list information for identifying a first portion of the program data written on the first storage medium; and
        second list information for identifying a second portion of the program data written on the second storage medium.

8. The data processing method of claim 7, wherein the step of writing further writes on the second storage medium: an identifier identifying the first storage medium; and medium management information including information which identifies a state, during recording, of the program data written on the first storage medium.

9. The data processing method of claim 7, wherein, the step of writing generates, as the first list information, an identifier identifying the first storage medium and position information identifying respectively a start position and an end position of the first portion of the program data, and generates, as the second list information, an identifier identifying the second storage medium and position information identifying respectively a start position and an end position of the second portion of the program data.

10. The data processing method of claim 9, wherein the step of writing generates the position information by utilizing at least one of: addresses on the first storage medium and the second storage medium at which the first portion and the second portion are stored; times of playing back the first portion and the second portion; and information uniquely identifying respectively the first portion and the second portion.

11. The data processing method of claim 10, wherein the first storage medium is an optical disk, and the second storage medium is a hard disk.

12. The data processing method of claim 11, wherein,
    a plurality of types of optical disks are mountable as the first storage medium; and
    the step of selecting selects a format based on the type of a mounted optical disk.

* * * * *

UNITED STATES PATENT AND TRADEMARK OFFICE
CERTIFICATE OF CORRECTION

PATENT NO. : 7,657,153 B2
APPLICATION NO. : 10/565057
DATED : February 2, 2010
INVENTOR(S) : Hideki Fukuda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1030 days.

Signed and Sealed this

Twenty-eighth Day of December, 2010

David J. Kappos
*Director of the United States Patent and Trademark Office*